United States Patent Office 3,006,274

Patented Oct. 31, 1961

3,006,274

LITHOGRAPHIC PRINTING METHOD

Raymond L. Oransky, Portland, Maine, and John R. Romig, Willoughby, Ohio, assignors to Addressograph-Multigraph Corporation, Cleveland, Ohio, a corporation of Delaware No Drawing. Filed Jan. 15, 1959, Ser. No. 786,909
2 Claims. (Cl. 101—149.2)

This application is a continuation-in-part of application Serial No. 712,069 filed January 30, 1958 and now abandoned.

In the art of lithographic printing we have found that coated paper base lithographic or so-called planographic printing plates, when erased over an image applied thereto by an imaging material, sometimes do not reimage well, that is, the reimage applied over the erased or corrected area does not reproduce entirely uniformly with the adjacent original images when the reimaged plate is used in reproducing copies on a lithographic duplicating press.

Although the phenomenon commonly occurs at more or less frequent intervals depending upon the particular kind of paper-base lithographic printing plates, we have found also that this failure of the reimaged area to reproduce satisfactorily is particularly true of certain paper base lithographic printing plates which have not been subjected to a brushing or rubbing action, such as is disclosed in United States Letters Patent No. 2,534,588, and that the failure of the reimaged areas to reproduce satisfactorily is most pronounced in those instances in which a so-called carbon ribbon, embodying an acetate, paper, or like base, as distinguished from a fabric base is used as the carrier for the reimaging material with an unbrushed lithographic printing plate.

Thus we have found that in those instances in which a so-called carbon ribbon, embodying an acetate, paper, or like base, as distinguished from a fabric base, is employed as the carrier for the reimaging material with an unbrushed coated paper base lithographic printing plate master and an imaged area of the master is erased and reimaged the reimaged area will not reproduce satisfactorily in that the copies reproduced from the erased and reimaged areas will not have the same printing characteristics as, and will not reproduce as well as, the other originally imaged and unerased areas of the plate.

Accordingly, an object of the present invention is to enable an erased area on a paper-base lithographic printing plate, having a lithographic colloid on the printing surface thereof, to be effectively restored incidental to delineation of a new image, and a related object is to develop a new and efficient surface-restoring composition which may be effectively used to treat erased imaged areas of coated paper base lithographic printing plates to assure that the new image applied thereto over the erased area will have substantially as good printing characteristics as, and will reproduce substantially as well as, the other and originally imaged and unerased areas of the plate.

Another object of the present invention is to develop an efficient surface-restorer composition for lithographic printing plates, which composition is particularly adapted for use in restoring the erased imaged plates, to which images have been applied by means of a carbon ribbon, embodying acetates, paper, or like base carrier, as distinguished from a fabric base, to the end that the erased imaged areas, treated with an image-restorer composition of the present invention, will have substantially the same and substantially as good printing characteristics as the unerased original areas of the plate, and will last as long as the original imaged areas.

An additional object of the invention is an efficient method for treating an erased area of a coated paper base planographic printing plate to the end that when the treated erased area is reimaged the new image will have substantially as good printing characteristics as, and will reproduce substantially as well as, the unerased original imaged areas of the plate.

Other objects of the present invention will be apparent from the following description which by way of illustration sets forth preferred embodiments of our invention and the principles thereof and what we now consider to be the best modes contemplated for applying these principles. Other embodiments of the invention embodying the same or equivalent principles may be used and changes may be made as desired by those skilled in the art without departing from the present invention and the purview of the appended claims.

In the practice of the present invention, an imaged coated paper base lithographic printing plate may be erased over an imaged area thereof, whereupon we apply to the erased image area a surface-restoring composition consisting essentially of an inorganic salt in solution which may have the composition set forth in any of the examples set forth hereinafter.

*Example No. 1*

| | Grams |
|---|---|
| Ferric chloride ($FeCl_3.6H_2O$) | 10 |
| Solvent (anhydrous denatured grain alcohol "Anhydrol") | 45 |

*Example No. 2*

| | |
|---|---|
| Ferric chloride ($FeCl_3.6H_2O$) | 2.5 |
| Solvent (anhydrous denatured grain alcohol "Anhydrol") | 45 |

*Example No. 3*

| | |
|---|---|
| Ferric chloride ($FeCl_3.6H_2O$) | 0.1 |
| Solvent (anhydrous denatured grain alcohol "Anhydrol") | 45 |

*Example No. 4*

| | |
|---|---|
| Ferric chloride ($FeCl_3.6H_2O$) | 2.5 |
| Solvent (acetone) | 45 |

In the practice of the present invention using ferric chloride the optimum compositions are those set forth in the foregoing Examples Nos. 2 and 4, although it has been found that the materials may be employed in the range of from 0.1 gram to 10 grams of ferric chloride ($FeCl_3.6H_2O$) to 45 grams of a suitable volatile solvent such as that indicated in the foregoing examples, which corresponds to an effective concentration of about 0.2% to 20%.

While the hydrous form of ferric chloride is used as the most common form of this salt, ferric chloride anhydrate may also be used, and in any event the preferred ferric chloride may be substituted by a salt producing substantially equivalent results as will be explained hereinafter. The solvent for the salt in the above examples is selected as one substantially colorless, quickly evaporating, non-toxic and non-destructive to paper and the lithographic colloid coated on the paper. This is also true of the examples to follow. If desired, some water may be present in the solvent as a cost consideration displacing up to about twenty-five percent of the acetone or alcohol. Water is, however, not as quickly evaporating as per se or undiluted acetone or alcohol or other organic solvent, and if water is present in the solvent then a corresponding reduction in evaporating rate will be experienced. Accordingly, it is preferred that the solvent be predominantly organic.

In applying the surface-restoring composition, it is highly desirable to avoid the application of an excess over the erased imaged area on the plate since such an excess will migrate toward and tend to pick up ink around the edges of the corrected or erased and reimaged area, and delays drying of the new image. It will be realized, however, that the present composition using a solvent having an evaporating rate greater than water under given conditions, will dry quickly when applied in the optimum amount by a glass rod burnisher or so-called tincturer.

We have also found that in some instances there may be a slight tendency for the surface-restoring composition, as set forth above, to pick up ink around the corrected or erased and reimaged area. However, we have found that this tendency of the new surface-restoring composition may be overcome by the addition thereto of a relatively small and non-critical amount of an oleophobic material such as silica aquasol prepared for example according to the process disclosed in the United States Patent No. 2,375,738, granted May 8, 1945 to John P. White and entitled "Preparation of Sols," and which is sold by Monsanto Chemical Company under the trademark "Syton." Advantageously, an oleophobic material is also to be included in compositions produced in accordance with the additional examples disclosed hereinafter.

Such a modification of the surface-restoring composition is set forth in the following example, and the following example also demonstrates how water can be used in part as a solvent; the only requirement being that water be compatible and miscible in the mixture:

*Example No. 5*

| | Grams |
|---|---|
| Ferric chloride ($FeCl_3.6H_2O$) (5 percent) | 2.5 |
| Solvent mixture (75 parts of anhydrous denatured alcohol, 25 parts of water) | 45 |
| Silica aquasol ("Syton"—0.15 silica, 0.85 water) | 1.0 |

Extensive investigations show that surface restorer solutions of stannic chloride exhibit superior results. The following examples are preferred specific embodiments wherein the surface restorer composition is in the form of approximately a 5% by weight solution of stannic chloride pentahydrate, $SnCl_4.5H_2O$:

| Example No. | Solvent and Volume | $SnCl_4.5H_2O$ |
|---|---|---|
| | | *Grams* |
| 6 | Methyl ethyl ketone—23.5 ml | 1 |
| 7 | Acetone—24.0 ml | 1 |
| 8 | Methanol—24.0 ml | 1 |
| 9 | Anhydrol—24.0 ml | 1 |
| 10 | Anhydrol—12.0 ml.; Methyl ethyl ketone—12.0 ml. | 1 |
| 11 | Anhydrol—12.0 ml.; Acetone—12.0 ml | 1 |

The superiority of stannic chloride over ferric chloride while appreciable is not great, and hence ferric chloride can be considered a substantial equivalent of stannic chloride.

Other solutions of salts in the form of chlorides and nitrates of various metals may be used as substitutes where circumstances or exigencies require. Concentration of a surface restoring salt in accordance with the present invention will of course vary depending upon the surface restoring ability or strength of the particular salt, the nature of the lithographic surface and so on. The optimum concentration of ferric chloride or stannic chloride for most conditions appears to be 5%. It has been mentioned that the usable range of about 0.2 to 20 percent is applicable to ferric chloride, and the usable range for stannic chloride pentahydrate is about 0.1 to 10%.

Examples of other, but somewhat less efficacious, surface restorer compositions including salts easily soluble (5% concentration is optimum) in alcohol, and in mixed solvents containing water, are the following, the solvents being indicated:

| Salt: | Solvent |
|---|---|
| 1. Aluminum nitrate | Anhydrol (hereinafter A). |
| 2. Aluminum nitrate | 25% distilled water, 75% methanol by weight (hereinafter WM). |
| 3. Aluminum chloride | WM. |
| 4. Ferric nitrate | WM. |
| 5. Cerium nitrate (Cerous) | WM. |
| 6. Zirconium oxychloride | WM. |
| 7. Zirconium chloride | A. |
| 8. Zirconium nitrate | WM. |
| 9. Stannic chloride | WM. |
| 10. Thorium chloride | WM. |
| 11. Thorium nitrate | WM. |
| 12. Uranyl nitrate | WM. |
| 13. Chromic chloride | WM. |
| 14. Chromic chloride | A. |
| 15. Chromic nitrate | WM. |
| 16. Chromic nitrate | A. |
| 17. Cupric chloride | WM. |
| 18. Cupric nitrate | WM. |
| 19. Zinc chloride | WM. |
| 20. Zinc nitrate | WM. |

Lithographic paper base or so-called planographic master plates coated with a colloid or other lithographic coating receptive to lithographic imaging materials and moisture are commonly prepared for office-type duplication by positioning the plate in a typewriter in the ordinary manner and then typing the image to be duplicated on the colloid surface of the plate through the medium of a ribbon which carries the lithographic imaging material. In practicing the present invention, and upon the occurrence of an error in typing such a plate, an erasure is made in the usual fashion of the incorrect character or characters whereupon the typist then applies to the erased area the surface restorer of the present invention. The area thus treated is allowed to dry and when completely dry the correct character (or characters) is then typed onto the previously erased and restored area of the lithographic master plate.

Hydrophilic-oleophilic materials serving as the essential lithographic coated surface on a paper base lithographic or so-called planographic printing plate are well known in the art as including a wide variety of water insoluble materials, including such diverse materials as casein, cellulose derivatives, sodium alginate, albumin, and so on. The present invention may be used in conjunction with any water insoluble hydrophilic-oleophilic coating requiring and susceptible to surface restoration in accordance with the present invention. Hence, while we have illustrated and described preferred embodiments of our invention it is to be understood that these are capable of variation and modification, and we therefore do not wish to be limited to the precise details set forth, but desire to avail ourselves of such changes and alterations as fall within the purview of the following claims.

We claim:

1. A method of restoring the erased image area of a coated paper base lithographic printing plate comprising: applying to said erased image area a restoring composition in the form of a solution of a salt selected from the group consisting of stannic chloride, cerous cerium nitrate, uranyl chloride, and the chlorides and nitrates of aluminum, zirconium, thorium, chromic chromium, cupric copper, zinc and ferric iron; allowing the solution so applied to said erased image area to dry thereby restoring said area for receipt of a new image; and then delineating a new image in the restored area of said plate.

2. A method according to claim 1 wherein said composition contains silica aquasol.

References Cited in the file of this patent

UNITED STATES PATENTS

| | | |
|---|---|---|
| 2,534,650 | Worthen | Dec. 19, 1950 |
| 2,681,617 | Worthen et al. | June 22, 1954 |